(12) United States Patent
Peng et al.

(10) Patent No.: US 7,426,105 B2
(45) Date of Patent: Sep. 16, 2008

(54) FIXING MECHANISM FOR BUTTON

(75) Inventors: Wen-Tang Peng, Tu-Cheng (TW);
Guang-Yi Zhang, Shenzhen (CN);
Mo-Ming Yu, Shenzhen (CN);
Shao-Kun Chen, Shenzhen (CN); Zhe Zhang, Shenzhen (CN); Hang-Kong Hu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 294 days.

(21) Appl. No.: 11/305,084

(22) Filed: Dec. 16, 2005

(65) Prior Publication Data

US 2006/0208551 A1    Sep. 21, 2006

(30) Foreign Application Priority Data

Dec. 17, 2004  (CN)  .................. 2004 2 0103106

(51) Int. Cl.
*H05K 7/12*  (2006.01)

(52) U.S. Cl. .................. 361/679; 248/27.3; 361/680
(58) Field of Classification Search .................. 361/679, 361/680; 248/27.3
See application file for complete search history.

(56) References Cited

U.S. PATENT DOCUMENTS

| 3,453,408 | A | * | 7/1969 | Mune | .................. 200/295 |
| 3,941,965 | A | * | 3/1976 | Piber | .................. 200/296 |
| 5,612,520 | A | * | 3/1997 | Toedtman et al. | .......... 200/16 D |
| 6,191,938 | B1 | * | 2/2001 | Ohgami et al. | .............. 361/681 |

* cited by examiner

*Primary Examiner*—Lisa Lea-Edmonds
*Assistant Examiner*—Ingrid Wright
(74) *Attorney, Agent, or Firm*—Morris Manning Martin LLP; Tim Tingkang Xia, Esq.

(57) ABSTRACT

A fixing mechanism for a button includes a shelf (11) and a bracket (80). The bracket includes a body (81). A pair of spaced apart first resilient arms (85) extends from an edge of the body 81, and a second resilient arm (83) extends from the edge between the first resilient arms. A free end of each first resilient arm is attached to the shelf, and the second resilient arm is for holding the button.

18 Claims, 4 Drawing Sheets

FIXING MECHANISM FOR BUTTON

BACKGROUND OF THE INVENTION

1. Field of the Invention

The present invention relates to a fixing mechanism, and more particularly to a fixing mechanism for a button.

2. General Background

Electronic devices, such as notebook computers, laptop computers, PDAs, are widely used. A notebook computer typically includes a plurality of function buttons for facilitating activating corresponding functions. For example, a suspend button is typically attached to a base of the notebook computer by a resilient strip, for being pressed by a foldable cover of the notebook computer to enter suspend mode when the cover is folded toward the base. The suspend button is typically fixed at a free end of the strip. Another end of the strip opposite to the free end is fixed to the base. However, elasticity of the strip is apt to be impaired by repeated deformation, and the strip becomes elastic failure rapidly.

What is desired, therefore, is a button fixing mechanism which has prolonged life.

SUMMARY

In one preferred embodiment, a fixing mechanism for a button includes a shelf and a bracket. The bracket includes a body and first and second resilient arms extending from an edge of the body. A free end of the first resilient arm is attached to the shelf, and the second resilient arm is adapted for holding the button.

The bracket of the fixing mechanism includes at least two resilient arms, therefore elasticity of the bracket gets better, and can endure repeated deformation.

Other advantages and novel features will become more apparent from the following detailed description of a preferred embodiment when taken in conjunction with the accompanying drawings, in which:

DETAILED DESCRIPTION OF THE EMBODIMENT

Figure 1:
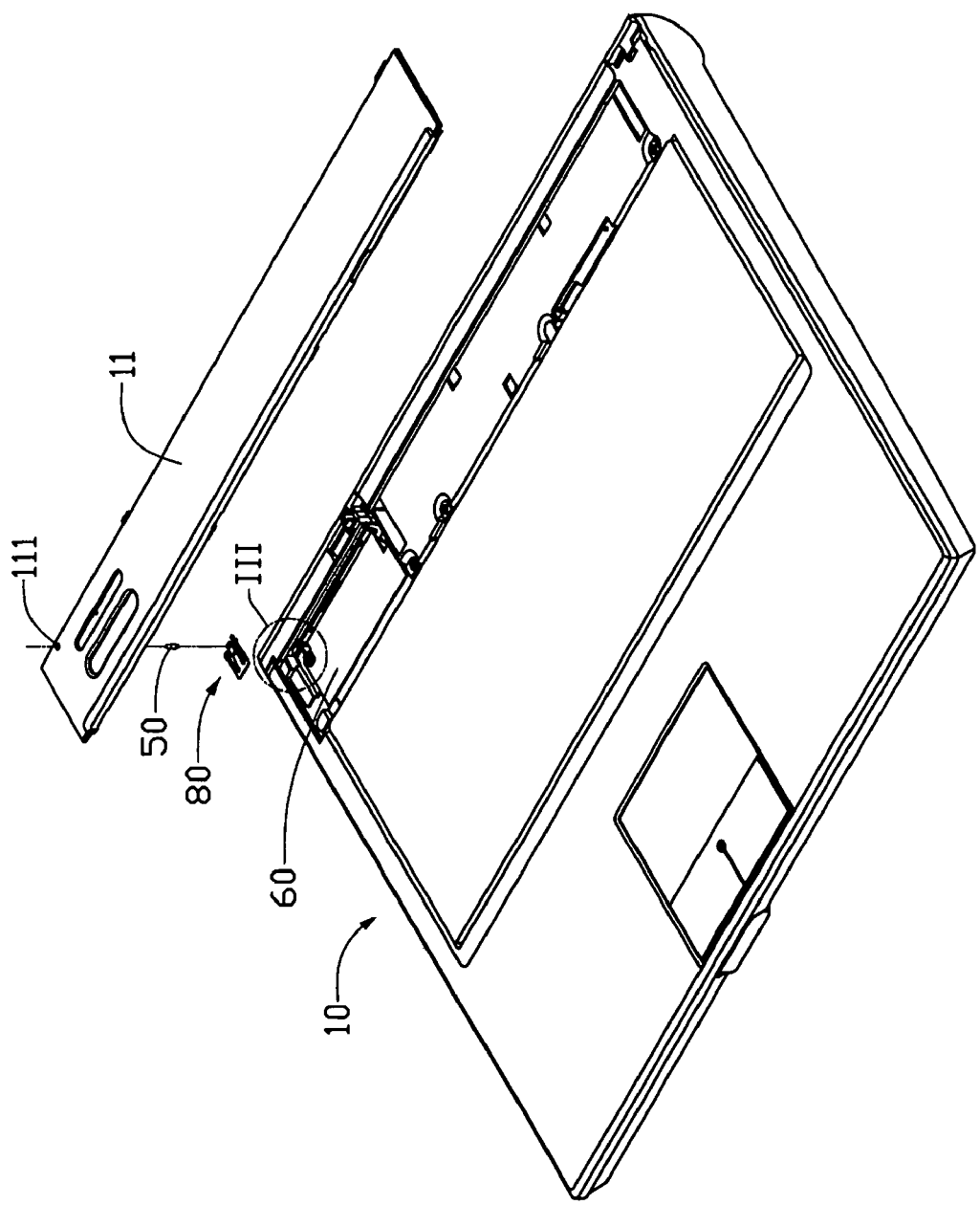
FIG. 1 is an exploded, isometric view of a fixing mechanism in accordance with a preferred embodiment of the present invention, a button and a base of a notebook computer, the fixing mechanism including a bracket.
Figure 5:
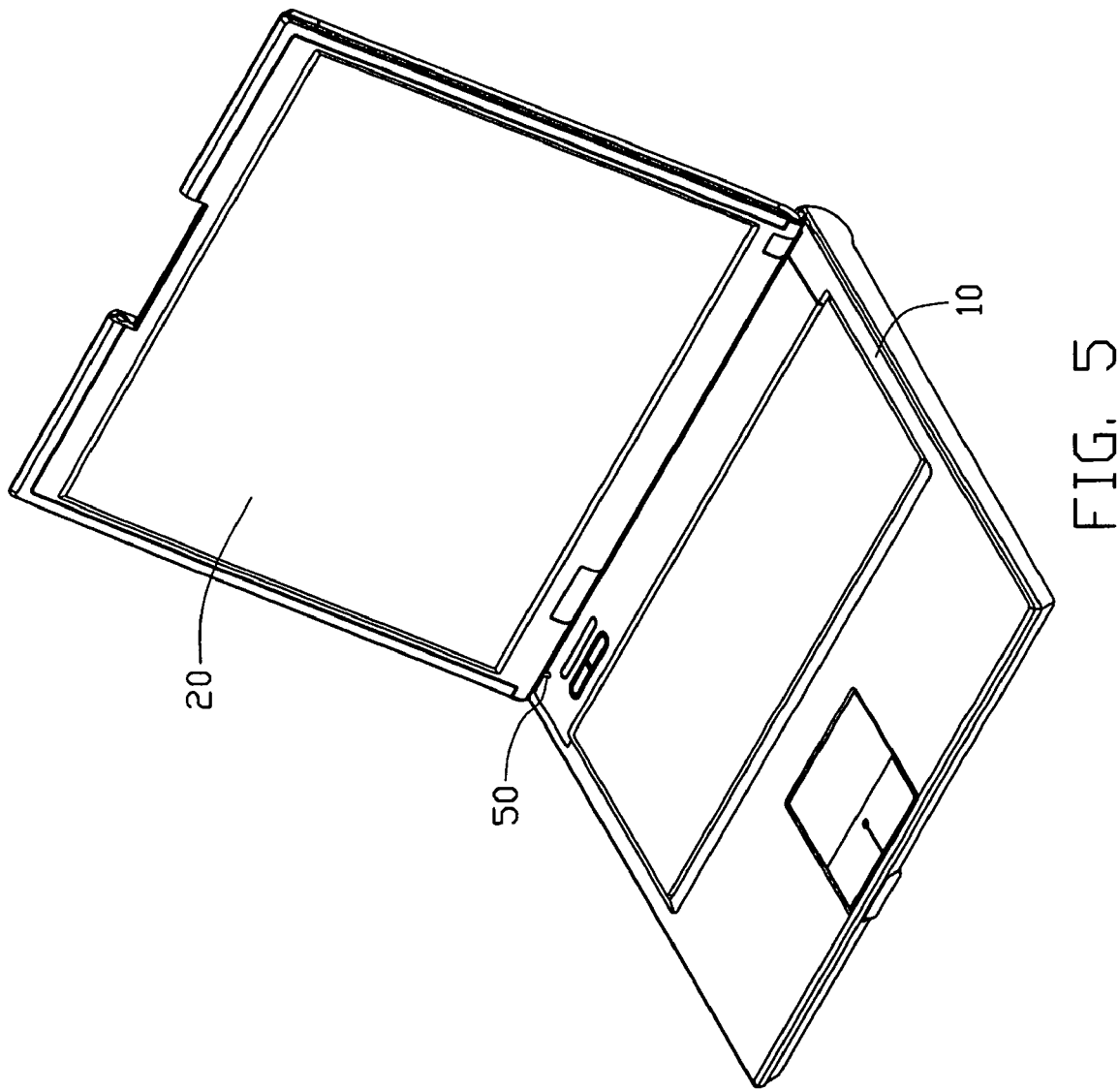
FIG. 5 shows the fixing mechanism is assembled to the notebook computer.

Referring to FIGS. 1 and 5, a fixing mechanism is provided to fix a trigger component like a button 50 to a base 10 of an electronic device like a notebook computer, the fixing mechanism including a shelf 11 attached to the base 10, and an elastic bracket 80.

Figure 3:
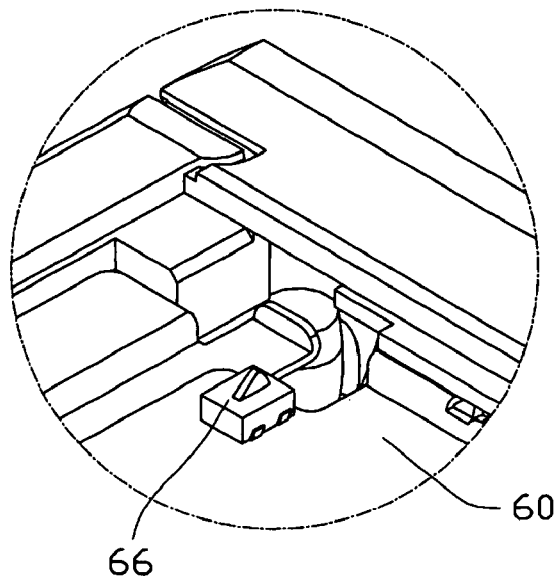
FIG. 3 is an enlarged view of a circled portion III of FIG. 1.

The notebook computer further includes a cover 20 incorporating a display such as a liquid crystal display (see FIG. 5). The base 10 houses electronic components, such as a CPU, a motherboard, a hard disc drive and a plurality of optional cards therein. Referring to FIG. 3, a control board 60 is arranged in the base 10, and includes a suspend switch 66. The control board 60 is electrically connected to the motherboard for activating a suspend mode via the suspend switch 66 being activated.

Figure 2:
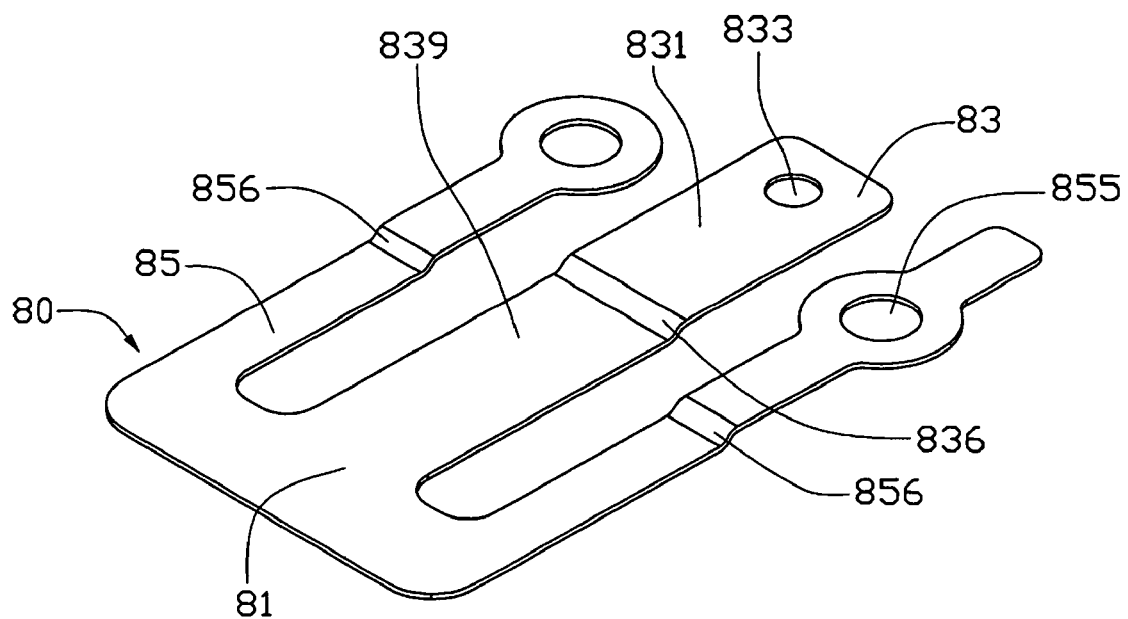
FIG. 2 is an enlarged view of the bracket of FIG. 1.

Referring to FIG. 2, the bracket 80 is generally E-shaped, and includes a strip-shaped body 81, a pair of spaced apart first resilient arms 85 extending from an edge of the body 81, and a second resilient arm 83 extending from the edge between the first resilient arms 85 and joining the pair of first resilient arms 85 together at a turning point defined in a remote, cantilevered end edge of the body 81. The turning point divides the cantilevered end edge of the body 81 and the pair of first resilient arms 85 into two portions which are substantially in a same plane and parallel to each other. The first and second resilient arms 85, 83 are generally parallel to each other. A first stepped portion 856 is formed at each first resilient arm 85 to divide corresponding first resilient arm 85 into two portions, and the first stepped portion 856 is a slanted portion in construction. An aperture 855 is defined in a free end of each first resilient arm 85. A second stepped portion 836 is formed at the second resilient arm 83 to divide the second resilient arm 83 into a driven portion 831 and an actuating portion 839, and the actuating portion 839 is directly connected to the body 81. A button hole 833 is defined in a free end of the driven portion 831 corresponding to the button 50.

Figure 4:
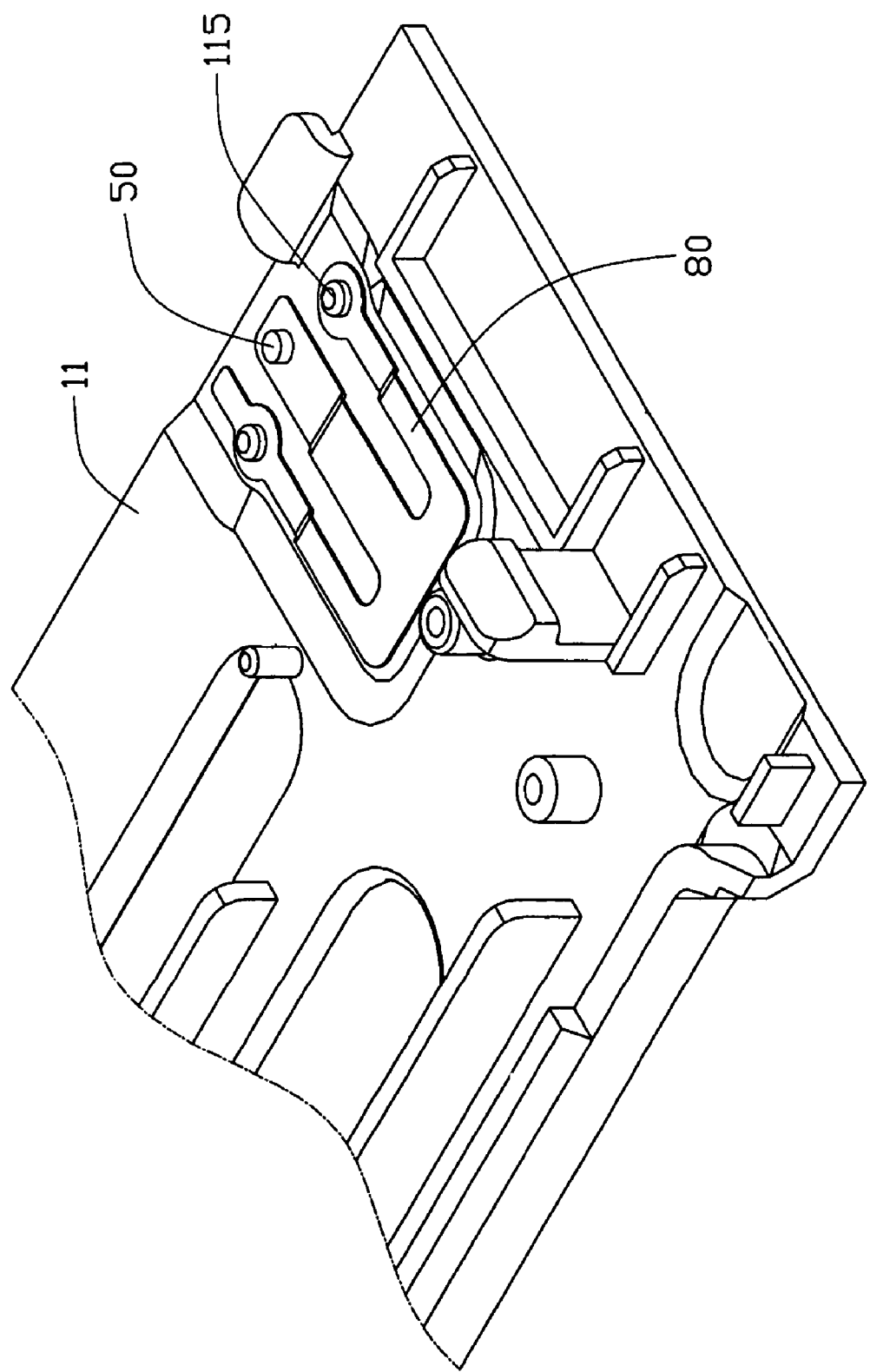
FIG. 4 is an assembled view of the fixing mechanism, showing the button is fixed.

Referring to FIGS. 1 and 4, the shelf 11 defines a through hole 111, corresponding to the button 50. A pair of posts 115 depends from a bottom of the shelf 11 corresponding to the apertures 855 of the first resilient arms 85.

In assembly, the button 50 is retained in the button hole 833 of the second resilient arm 83 of the bracket 80. The bracket 80 is then positioned to the bottom of the shelf 11 and is parallelly attached to the base 10 together with the shelf 11. The button 50 protrudes beyond a top of the shelf 11 through the hole 111. In details, the button 50 is secured to the cantilevered second resilient arm 83 to activate the switch 66 under the self 11. In details, the button 50 is secured to the cantilevered second resilient arm 83 to activate the switch 66 under the self 11. The posts 115 of the shelf 11 are extended through the apertures 855 of the first resilient arms 85 respectively. The posts 115 are heated to melt to fix the bracket 80 to the shelf 11. The shelf 11 is then attached to the base 10, with the actuating portion 839 of the second resilient arm 83 positioned over the suspend switch 66 of the control board 60 of the base 10.

In use, when the cover 20 of the notebook computer is folded toward the base 10, the button 50 is pressed downward by the cover 20. The button 50 drives the driven portion 831 of the second resilient arm 83 of the bracket 80 toward the control board 60. The bracket 80 is wholly pushed downward, and the second resilient arm 83 is deformed such that the actuating portion 839 of the second resilient arm 83 contacts the suspend switch 66 of the control board 60. The suspend switch 66 is activated to make the notebook computer enter a suspend mode. When the cover 20 is opened to a normal viewing position, the first and second resilient arms 83, 85 rebound to disengage from the suspend switch 66 to exit the suspend mode.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A fixing mechanism assembly comprising:
a shelf defining a through hole therein;
a bracket parallelly attached to a bottom of the shelf, the bracket comprising a body and first and second resilient arms extending from an edge of the body, a free end of the first resilient arm being attached to the shelf; and
a trigger component secured to the second resilient arm configured to be moveable together with the second resilient arm to activate a switch under the shelf the trigger component protruding beyond a top of the shelf through the through hole.

2. The fixing mechanism assembly as claimed in claim 1, wherein the first resilient arm comprises a stepped portion to divide the first resilient arm into two portions, the two portions are parallel to each other.

3. The fixing mechanism assembly as claimed in claim 2, wherein the stepped portion of the first resilient arm is slanted in construction.

4. The fixing mechanism assembly as claimed in claim 1, wherein an aperture is defined in the free end of the first resilient arm, and a post depends from the bottom of the shelf and is secured in the aperture.

5. The fixing mechanism assembly as claimed in claim 1, wherein the second resilient arm comprises a stepped portion to divide the second resilient arm into two portions, the two portions are parallel to each other, and one of the two portions defines a hole adapted for receiving the trigger component.

6. The fixing mechanism assembly as claimed in claim 5, wherein the other one of the two portions of the second resilient arm is arranged to the edge of the body for engaging a component.

7. The fixing mechanism assembly as claimed in claim 1, wherein the bracket further comprises another first resilient arm, and the second resilient arm is arranged between and spaced apart from the first resilient arms.

8. The fixing mechanism assembly as claimed in claim 1, wherein the first and second resilient arms are parallel to each other.

9. A fixing mechanism assembly comprising:
a shelf defining a through hole therein;
a deformable bracket attached to a bottom of the shelf with one end thereof cantilevered with respect to the shelf, the bracket comprising a resilient cantilevered arm extending from the cantilevered end toward a position at which the bracket is attached; and
a button secured to the cantilevered arm of the bracket configured to be moveable together with the cantilevered arm to activate a switch under the shelf, the button protruding beyond a top of the shelf through the through hole.

10. The fixing mechanism assembly as claimed in claim 9, wherein the bracket comprises a pair of first resilient arms extending from the cantilevered end, and free ends of the first resilient arms are respectively secured to the shelf.

11. The fixing mechanism assembly as claimed in claim 10, wherein the cantilevered arm is located between the first resilient arms.

12. The fixing mechanism assembly as claimed in claim 10, wherein each of the first resilient arms comprises a slanted stepped portion to divide respective first resilient arm into two portions, and the two portions are parallel to each other.

13. The fixing mechanism assembly as claimed in claim 9, wherein the cantilevered arm comprises a stepped portion to divide cantilevered arm into two portions, the two portions are parallel to each other, and one of the two portions defines a hole adapted for receiving the button.

14. The fixing mechanism assembly as claimed in claim 13, wherein the other one of the two portions of the cantilevered resilient arm is arranged to the edge of the body for engaging a component.

15. The fixing mechanism assembly as claimed in claim 9, wherein the bracket is parallel with the shelf.

16. An electronic device comprising:
a base of said electronic device;
a trigger component movably installable in said base and capable of functioning around a surface of said base by means of movement thereof relative to said base;
a bracket parallelly attached to said base and installable beside said trigger component in said base so as to supportively maintain said movement of said trigger component by means of resilience thereof, said bracket comprising a resilient extension defining at least one turning point therein for providing said resilience, said at least one turning point dividing said resilient extension into two portions which are substantially in a same plane and parallel to each other; and
a switch installable in said base spaced from said surface of said base and located within a movement reach of said trigger component so as to be responsive to engagement between said switch and said trigger component.

17. The electronic device as claimed in claim 16, wherein said resilient extension of said bracket comprises at least two resilient arms parallel arranged to each other, and said at least one turning point is defined at a joint of two of said at least two resilient arms.

18. The electronic device as claimed in claim 16, wherein said trigger component is secured to said resilient extension of said bracket to be vertically movable relative to said base.

* * * * *